(12) United States Patent
de Léon et al.

(10) Patent No.: US 9,791,923 B2
(45) Date of Patent: Oct. 17, 2017

(54) FUNCTION OF TOUCH PANEL DETERMINED BY USER GAZE

(75) Inventors: David de Léon, Lund (SE); Fredrik Johansson, Malmo (SE)

(73) Assignee: Sony Mobile Communications Inc., Tokyo (JP)

( * ) Notice: Subject to any disclaimer, the term of this patent is extended or adjusted under 35 U.S.C. 154(b) by 29 days.

(21) Appl. No.: 14/375,275

(22) PCT Filed: Feb. 15, 2012

(86) PCT No.: PCT/IB2012/050700
§ 371 (c)(1),
(2), (4) Date: Jul. 29, 2014

(87) PCT Pub. No.: WO2013/121249
PCT Pub. Date: Aug. 22, 2013

(65) Prior Publication Data
US 2014/0375586 A1 Dec. 25, 2014

(51) Int. Cl.
*H04N 21/81* (2011.01)
*G06F 3/01* (2006.01)
(Continued)

(52) U.S. Cl.
CPC .............. *G06F 3/013* (2013.01); *G06F 3/041* (2013.01); *H04N 21/4222* (2013.01);
(Continued)

(58) Field of Classification Search
CPC ......... H04N 21/8186; H04N 21/42213; H04N 21/4223; H04N 21/42209;
(Continued)

(56) References Cited

U.S. PATENT DOCUMENTS

2007/0229465 A1 10/2007 Sakai et al.
2008/0068285 A1 3/2008 Kondo et al.
(Continued)

FOREIGN PATENT DOCUMENTS

CN 1617586 A 5/2005
JP 2009301166 A 12/2009

OTHER PUBLICATIONS

International Search Report and Written Opinion; dated Jul. 17, 2012; issued in International Patent Application No. PCT/IB2012/050700.
(Continued)

*Primary Examiner* — Charles Hicks
(74) *Attorney, Agent, or Firm* — James C. Edwards; Moore & Van Allen PLLC

(57) ABSTRACT

The invention is directed to systems, methods and computer program products for configuring a user interface of a portable mobile communication device. An exemplary method includes determining, by at least one of the portable mobile communication device or an electronic device in communication with the portable mobile communication device, a direction associated with a user's gaze. Additionally, the method includes at least one of: in response to determining the direction associated with the user's gaze is at least partially towards a display associated with the electronic device, configuring the portable mobile communication display to function as a touch pad that enables interaction with a user interface displayed on the electronic device; or in response to determining the direction associated with the user's gaze is at least partially towards a display associated with the portable mobile communication device, configuring the portable mobile communication device display to display a user interface.

19 Claims, 6 Drawing Sheets

(51) Int. Cl.
*H04N 21/422* (2011.01)
*H04N 21/4223* (2011.01)
*H04N 21/442* (2011.01)
*G06F 3/041* (2006.01)
*H04N 21/4782* (2011.01)

(52) U.S. Cl.
CPC ... *H04N 21/4223* (2013.01); *H04N 21/42207* (2013.01); *H04N 21/42209* (2013.01); *H04N 21/42224* (2013.01); *H04N 21/44218* (2013.01); *H04N 21/8186* (2013.01); *G06F 2203/04108* (2013.01); *H04N 21/4221* (2013.01); *H04N 21/42213* (2013.01); *H04N 21/42222* (2013.01); *H04N 21/4782* (2013.01)

(58) Field of Classification Search
CPC ....... H04N 21/42207; H04N 21/42224; H04N 21/42222; H04N 21/4222; H04N 21/44218; H04N 21/4782; H04N 21/4221; G06F 3/013; G06F 2203/04108; G06F 3/041
See application file for complete search history.

(56) References Cited

U.S. PATENT DOCUMENTS

| | | | |
|---|---|---|---|
| 2009/0109183 A1 | 4/2009 | Carvajal et al. | |
| 2010/0245680 A1* | 9/2010 | Tsukada | H04N 5/4403 348/734 |
| 2010/0333135 A1* | 12/2010 | Lau | H04N 5/4403 725/39 |
| 2012/0030619 A1 | 2/2012 | Lee et al. | |
| 2012/0218398 A1* | 8/2012 | Mehra | G06F 3/013 348/78 |

OTHER PUBLICATIONS

International Preliminary Report on Patentability; dated Aug. 28, 2014; issued in International Patent Application No. PCT/IB2012/050700.

State Intellectual Property Office, P.R. China; First Office Action; dated May 16, 2016; issued in Chinese Patent Application No. 201280069872.2.

State Intellectual Property Office, P.R. China;Second Office Action; dated Dec. 23, 2016; issued in Chinese Patent Application No. 201280069872.2.

* cited by examiner

FUNCTION OF TOUCH PANEL DETERMINED BY USER GAZE

BACKGROUND

A user of a portable mobile communication device may want to view a larger presentation of the portable mobile communication device display on an electronic device, e.g., a television, monitor, smart screen, tablet, etc. Additionally, a user of the portable mobile communication device may want to use the portable mobile communication device as an interaction device to interact with information displayed on the electronic device. What is needed is a method to enable the portable mobile communication device to accomplish these functions and to seamlessly switch between these functions.

BRIEF SUMMARY

Embodiments of the invention are directed to systems, methods and computer program products for configuring the user interface of a portable mobile communication device. In some embodiments, the method comprises determining, by at least one of the portable mobile communication device or an electronic device in communication with the portable mobile communication device, a direction associated with a user's gaze; and in response to determining the direction associated with the user's gaze is at least partially towards a display associated with the electronic device, configuring the portable mobile communication display to function as a touch pad that enables interaction with a user interface displayed on the electronic device display.

In some embodiments, the method further comprises in response to determining the direction associated with the user's gaze is at least partially towards the portable mobile communication device display, configuring the portable mobile communication device display to display a user interface. In some embodiments, the electronic device display is configured to display the user interface displayed by the portable mobile communication device display in response to determining the direction associated with the user's gaze is at least partially towards the portable mobile communication device display.

In some embodiments, the user interface displayed on the electronic device is a user interface associated with the portable mobile communication device. In some embodiments, the user interface displayed on the electronic device display is a user interface associated with the electronic device. In some embodiments, the graphical indicator is displayed on the user interface, and wherein the touch pad enables, via the graphical indicator, interaction with the user interface.

In some embodiments, the portable mobile communication device display is associated with a touch panel. The touch panel may be positioned on top of the portable mobile communication device display, and may even be in contact with the display. In some embodiments, the touch panel may be at least partially transparent and a user interface may be visible through the touch panel. A processor associated with the portable communication device associates a touch on the touch panel with information or an object displayed on the user interface.

In some embodiments, the configuring step further comprises configuring the portable mobile communication device display to not display a user interface. In some embodiments, the configuring step further comprises configuring the portable mobile communication device display to display a blank interface. In some embodiments, the configuring step further comprises configuring the portable mobile communication device to deactivate the portable mobile communication device display.

In some embodiments, at least one of the portable mobile communication device or the electronic device comprises an image capturing component. In some embodiments, the portable mobile communication device is in wireless communication with the electronic device. In some embodiments, the electronic device is at least one of a television, monitor, smart screen, or tablet.

In some embodiments, the direction associated with the user's gaze comprises a line of sight associated with at least one of the user's eye or the user's face. In some embodiments, the touch pad accepts at least one of single-touch or multi-touch input.

In some embodiments, the method further comprises at least one of: in response to determining both the direction associated with the user's gaze is not at least partially towards the portable mobile communication device display and not at least partially towards the electronic device display, configuring the portable mobile communication device display to display a user interface; or in response to determining both the direction associated with the user's gaze is at least partially towards the portable mobile communication device display and at least partially towards the electronic device display, configuring the portable mobile communication device display to display a user interface.

In some embodiments, the method further comprises in response to receiving a selection of an electronic device mode option via the touch pad, displaying selectable control options on the portable mobile communication device display.

In some embodiments, the method further comprises in response to determining that a direction associated with a user's eye is substantially different from a direction associated with the user's face, determining a direction associated with the user's gaze based on the direction associated with the user's eye.

In some embodiments, the method further comprises enabling a user to input a selection via the portable mobile communication display to switch between modes, wherein, in a first mode, the portable mobile communication device is configured to display a user interface, and wherein, in a second mode, the portable communication device is configured to function as a touch pad that enables interaction with a user interface displayed on the electronic device display.

An exemplary computer program product for configuring a user interface of a portable mobile communication device that is in communication with an electronic device comprises a non-transitory computer readable medium comprising code configured to: determine a direction associated with a user's gaze; and in response to determining the direction associated with the user's gaze is at least partially towards a display associated with the electronic device, configuring the portable mobile communication display to function as a touch pad that enables interaction with a user interface displayed on the electronic device display.

An exemplary portable mobile communication device, which is in communication with an electronic device, comprises: a display; an image capturing component; a touch panel associated with the display; and a processor to: determine, using the image capturing component, a direction associated with a user's gaze; and in response to determining the direction associated with the user's gaze is at least partially towards a display associated with the electronic device, configuring the touch panel to function as a touch pad that enables interaction with a user interface displayed on a display associated with the electronic device.

BRIEF DESCRIPTION OF THE DRAWINGS

Figure 1:
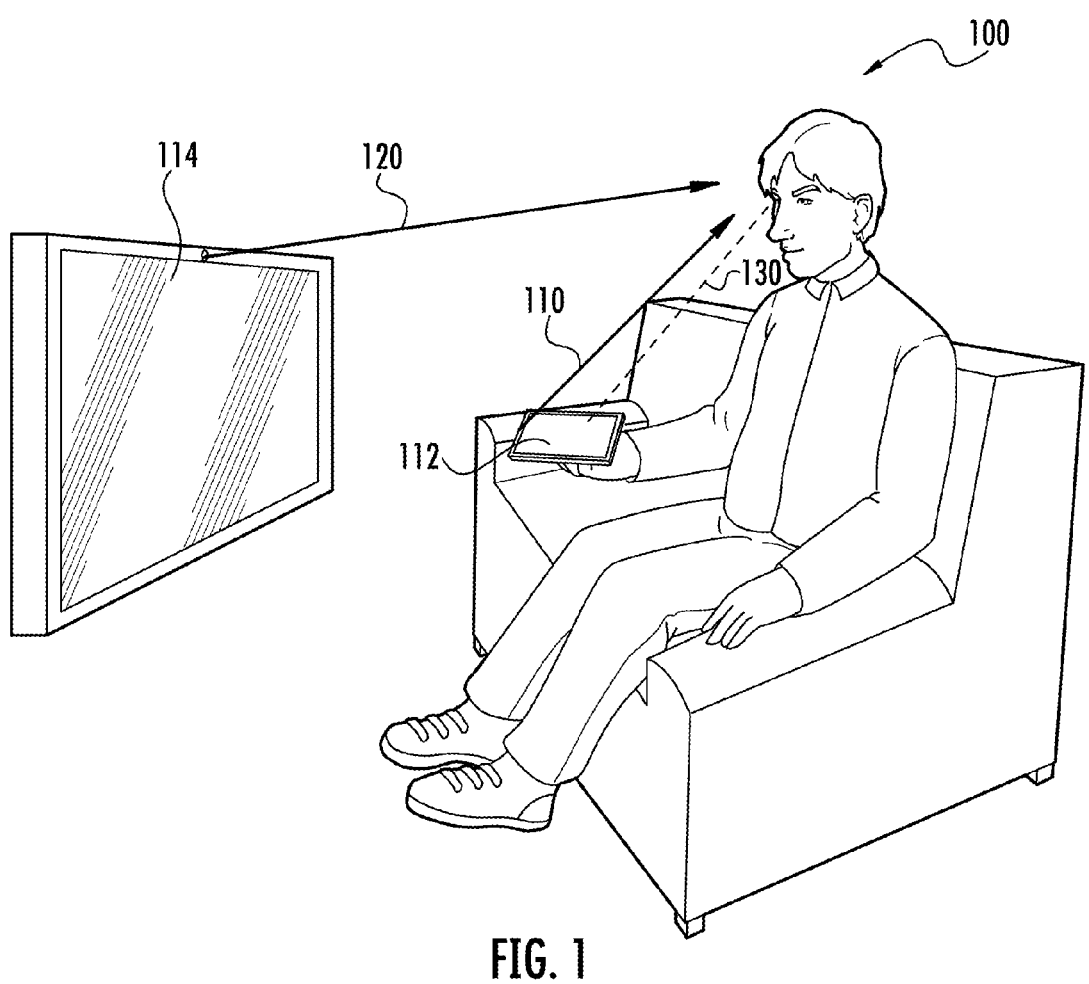
Figure 2:
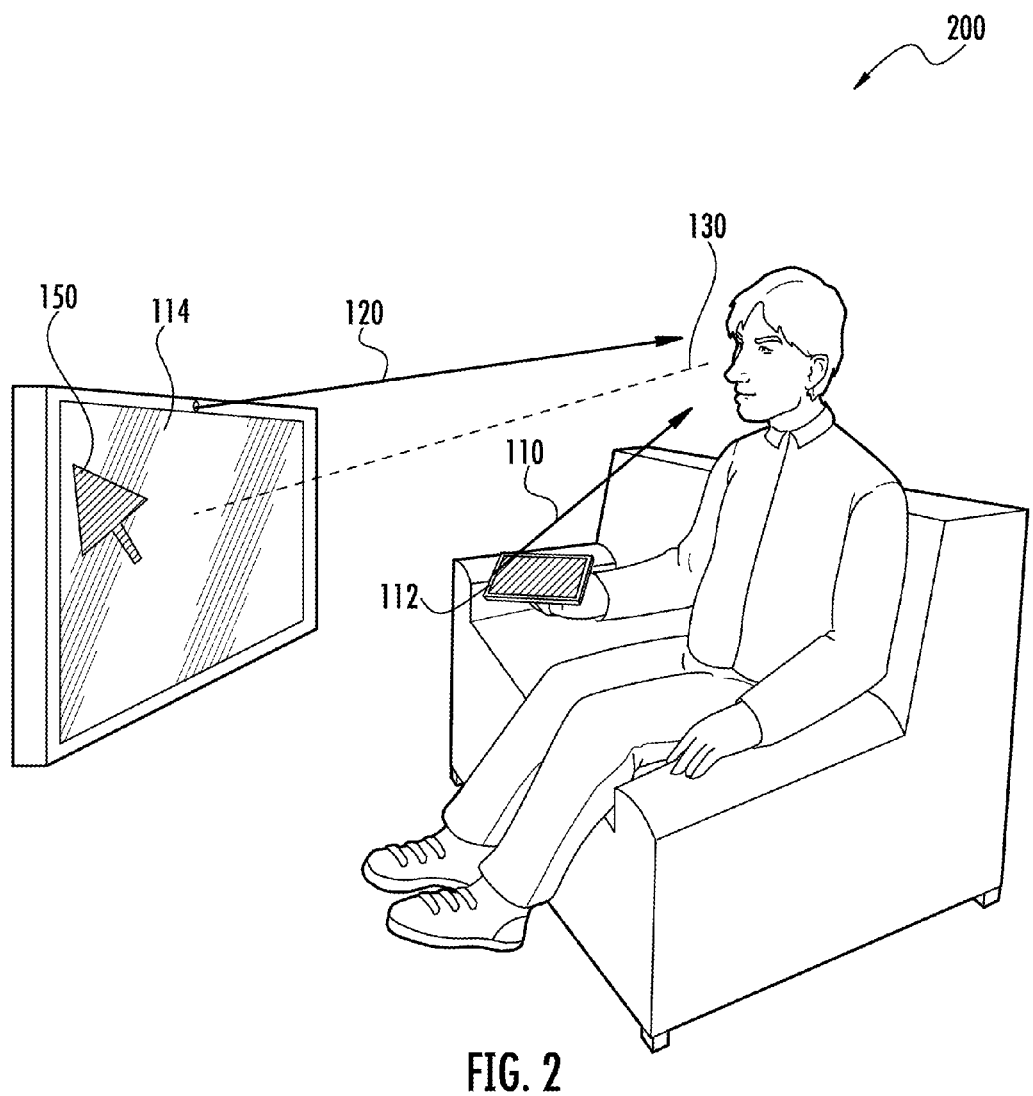
Figure 3:
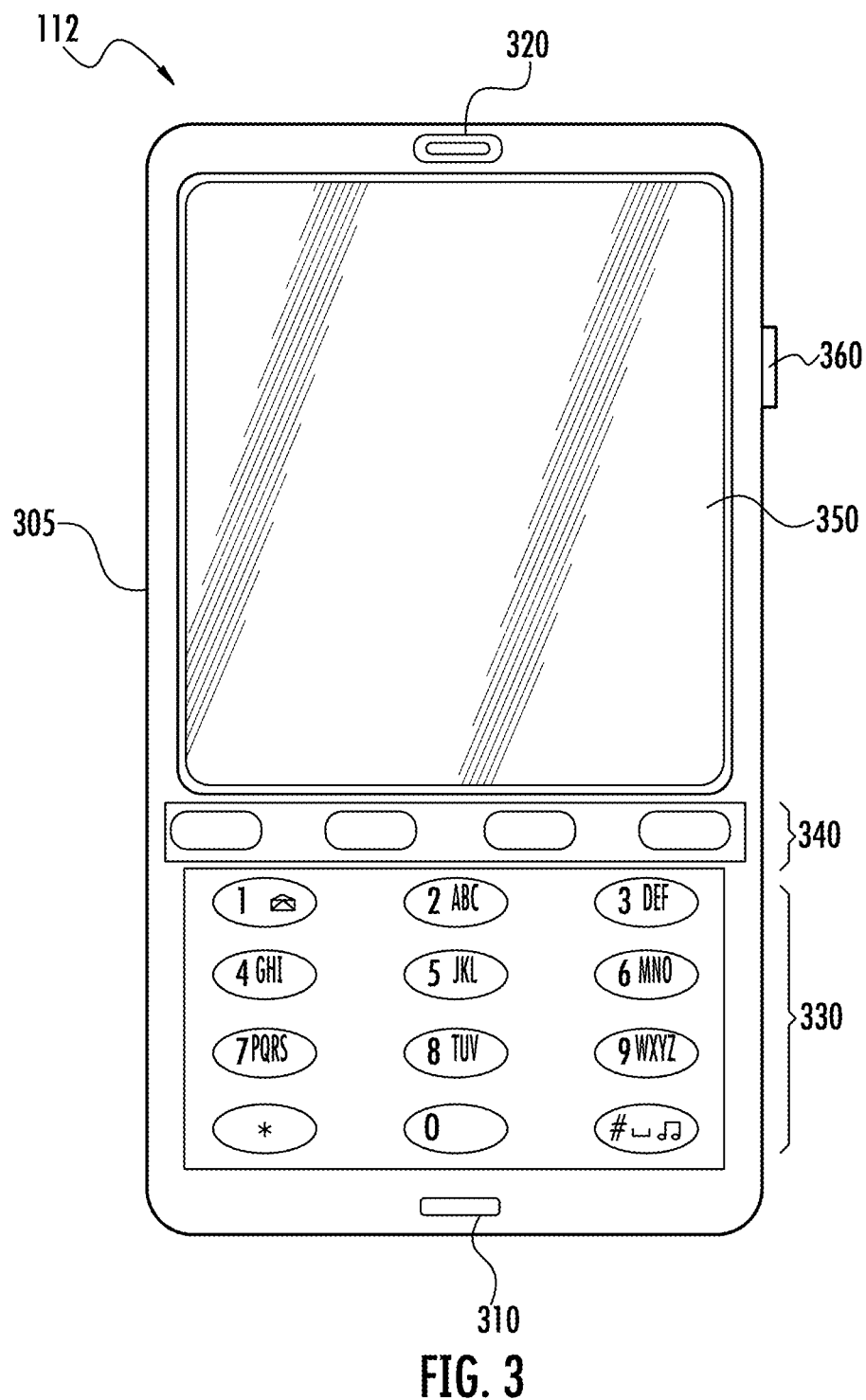
Figure 4:
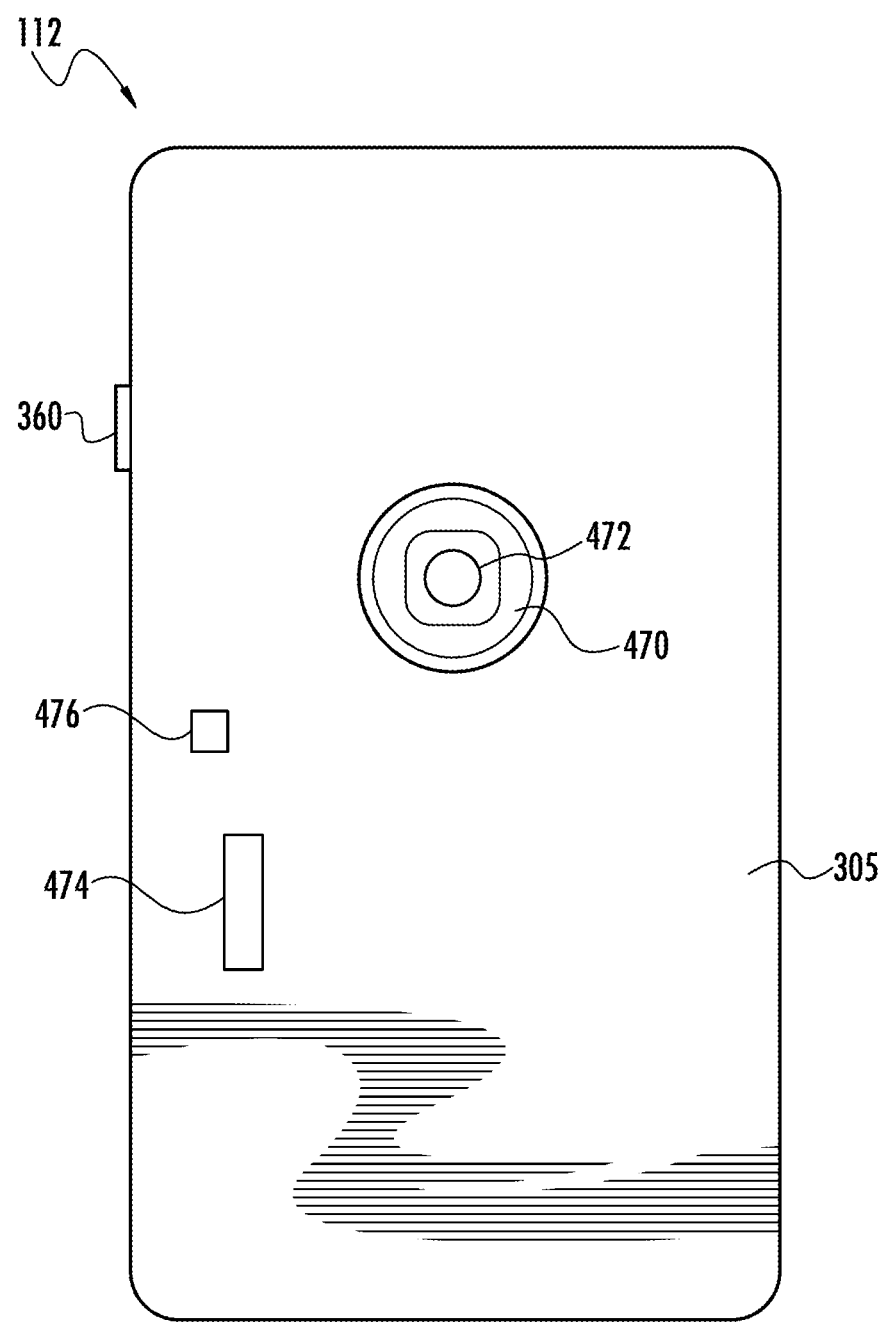
Figure 5:
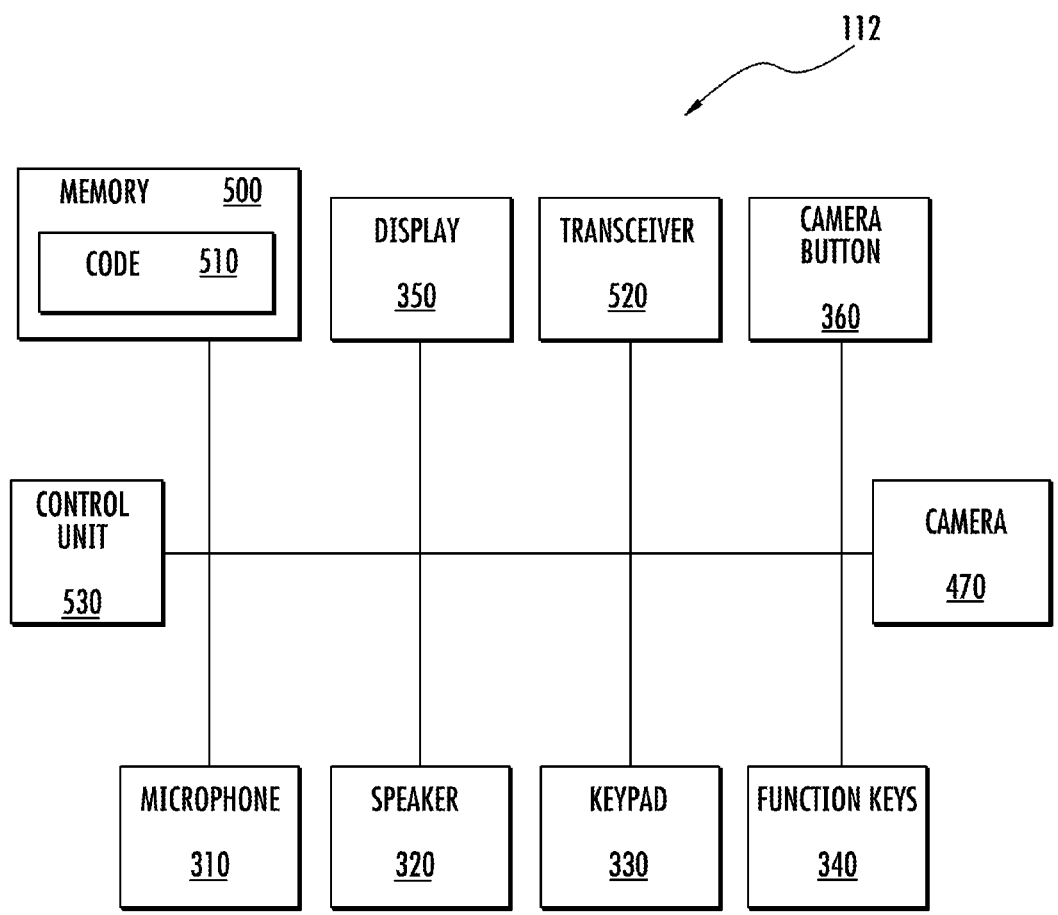
Figure 6:
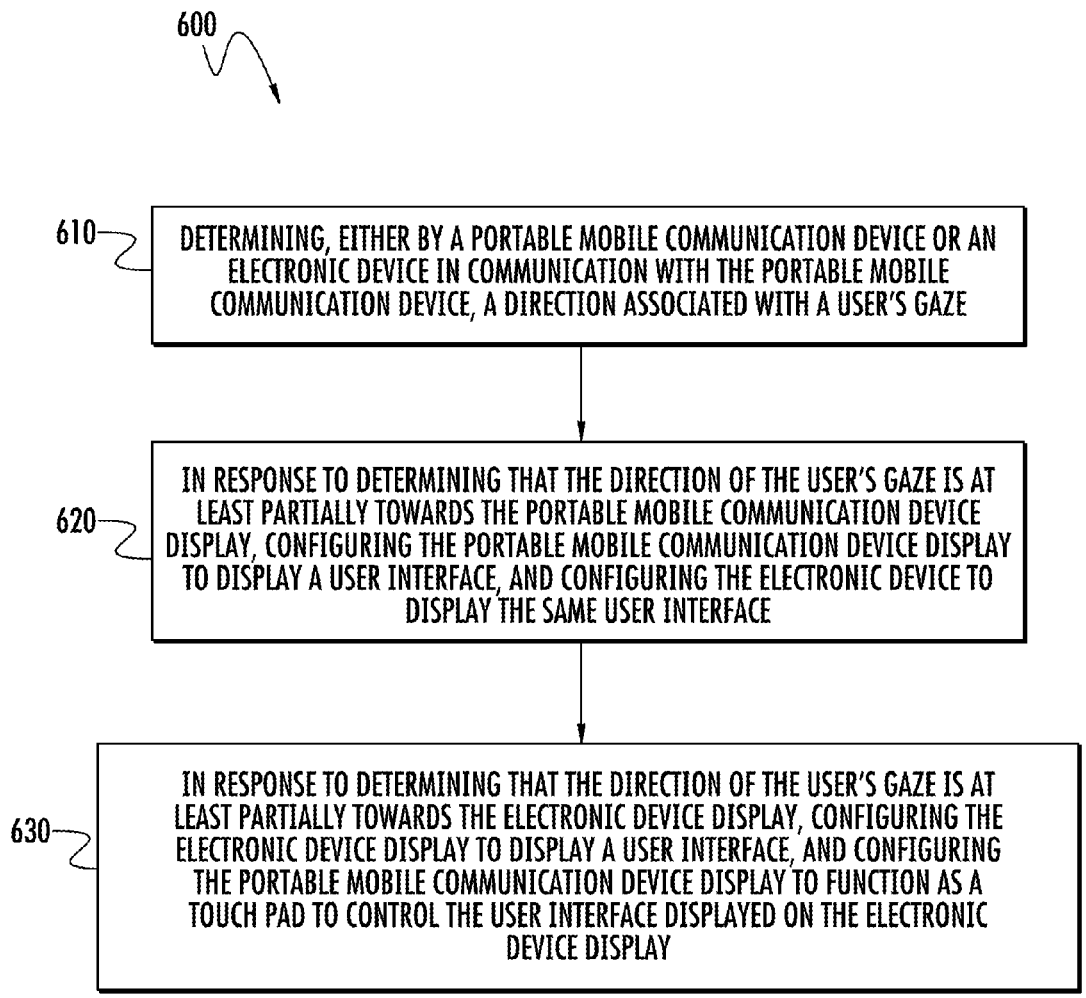

Having thus described embodiments of the invention in general terms, reference will now be made to the accompanying drawings, where:

FIG. 1 is an exemplary mode of operation associated with a portable mobile communication device, in accordance with embodiments of the present invention;

FIG. 2 is another exemplary mode of operation associated with a portable mobile communication device, in accordance with embodiments of the present invention;

FIG. 3 is an exemplary portable mobile communication device, in accordance with embodiments of the present invention;

FIG. 4 is a diagram illustrating a rear view of exemplary external components of the portable mobile communication device depicted in FIG. 3, in accordance with embodiments of the present invention;

FIG. 5 is a diagram illustrating exemplary internal components of the portable mobile communication device depicted in FIG. 3, in accordance with embodiments of the present invention; and FIG. 6 is an exemplary process flow for configuring the user interface of a portable mobile communication device, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

In embodiments described herein, a display of a portable mobile communication device may be associated with a touch panel. In some embodiments, a touch panel may be positioned on top of the display and may even be in contact with the display. The touch panel may be at least partially transparent so that the user interface that is displayed on the display is visible through the touch panel. When a user touches the touch panel, a processor associated with the portable mobile communication device associates the user's touch with an object or information presented on the user interface (e.g., a graphical user interface). Embodiments of the invention are not limited to any particular touch panel display construction. Therefore, when the portable mobile communication device display functions in touch panel mode, a user may interact with the user interface presented on the portable mobile communication device display by touching the touch panel with a finger, a stylus, or the like. For example, a user may move a visible graphical indicator (e.g., a cursor) presented on the user interface by moving the user's finger on the touch panel while touching the touch panel. As a further example, a user may double-click on a graphical icon visible on the user interface by tapping the user's finger on the user interface twice in quick succession.

In some embodiments described herein, a touch panel display of the portable mobile communication device functions as a touch pad or track pad or functions in track pad or touch pad mode. In this mode, a user interface is not presented on the portable communication device display. Therefore, the portable mobile communication device display may be deactivated (off) or may be activated (on) but may display a blank interface. However, the user may interact with a user interface presented on a display associated with a remote electronic device (e.g., a television, monitor, smart screen, tablet, etc.) by touching the touch pad with a finger, a stylus, or the like, wherein the remote electronic device is in communication with the portable mobile communication device. In some embodiments, the user interface is an interface that is being executed by a processor associated with the portable mobile communication device, while in other embodiments, the user interface is an interface that is being executed by a processor associated with the remote electronic device.

The invention is not limited to any particular types of electronic devices. As used herein, an electronic device may refer to any computing or non-computing electronic device that includes a display. Examples of electronic devices include televisions, laptop computers, smart screens, tablet computers or tablets, desktop computers, e-readers, scanners, portable media, mobile computing devices (e.g., mobile phones), image capturing devices (e.g., cameras), gaming devices, or other portable or non-portable computing or non-computing devices. In embodiments where the electronic device display has larger dimensions when compared to the portable mobile communication device display, the electronic device display presents a larger version of the user interface that is displayable on the portable mobile communication device display.

A portable mobile communication device may be connected to an electronic device using one or more wire-based technologies. An example of a wire-based technology is high-definition multimedia interface (HDMI). When the portable mobile communication device is connected to an electronic device, the user interface of the portable mobile communication device may be displayed on the electronic device. A user may interact with the displayed user interface using the portable mobile communication device.

In some embodiments, a portable mobile communication device may be connected to an electronic device using one or more wireless technologies. Exemplary wireless technologies include near-field communication (NFC), infra-red transmission (IR), Bluetooth, short-range radio frequency (RF) signals, IEEE 802.11x, WiFi, wireless universal serial bus (USB), HomeRF, IrDA-based (Infrared Data Association) transmission, etc. The invention is not limited to any wired or wireless technologies described herein. When a portable mobile communication device is connected to an electronic device either via a wired or wireless technology, the portable mobile communication device may operate in one of two modes.

In a first mode, the user interface of the portable mobile communication device may be displayed on the electronic device display. In such embodiments, any interactions between the user and the portable mobile communication device are visible both on the portable mobile communication device and on the electronic device. Therefore, the user may use the touch panel of the portable mobile communication device to interact directly with both the user interface of the portable mobile communication device and the user interface visible on the electronic device display.

In a second mode, different interfaces may be displayed on the portable mobile communication device and on the electronic device. In such embodiments, the portable mobile communication device user interface may be displayed on the electronic device, while the portable mobile communication device's display displays a blank interface. An example of an interface displayed on the electronic device display is a web browser application that is currently active on the portable mobile communication device. In such embodiments, a processor associated with the portable mobile communication device executes or runs the application, and the electronic device display displays the graphical user interface (GUI) associated with the application. Additionally, in such embodiments, a processor associated with the electronic device may not run or execute the application.

Alternatively, an interface independent of the portable mobile communication device user interface may be displayed on the electronic device, while the portable mobile communication device's display displays a blank interface. An example of an interface independent of the portable mobile communication device is an electronic device interface such as an electronic device guide (e.g., a television guide), a recording menu, etc. A further example of an interface may be a web browser application that is executed directly by a computing processor associated with the electronic device and is displayed on the electronic device display. In such embodiments, a processor associated with the electronic device executes or runs the application, and a processor associated with the portable mobile communication device does not run or execute the application.

As used herein, a blank interface (displayed on the touch panel) may be a display interface that is switched off or deactivated, or may be a display interface that is switched on and displays a blank screen. In some alternate embodiments, instead of a blank interface, the portable mobile communication device's display displays a visible graphical indicator (e.g., a cursor) on an unchanging or static background. The blank interface may be of any color (e.g., white, black, blue, etc.). The graphical indicator may be controlled via the user's touch.

In embodiments described herein, the touch panel of the portable mobile communication device may be used as a track pad (may also be referred to as a touch pad) for moving a graphical indicator such as a cursor on the user interface displayed on the electronic device display. Therefore, when the user moves the user's finger or a stylus on the touch panel, the cursor substantially mirrors the finger or stylus movement on the electronic device display. In some embodiments, when the user moves the user's finger or a stylus on the touch panel, the user sees a blank interface on the touch panel. In other embodiments, when the user moves the user's finger or a stylus on the touch panel, the user may see a moving visible cursor on an unchanging background (e.g., a dark cursor on a light background, a light cursor on a dark background, etc.). Therefore, when a web browser interface is displayed on the electronic device display, a user of the touch panel may use the touch panel to control a cursor that can be used to navigate the web browser interface and select (e.g., double tapping on the touch panel) one or more selectable options.

The touch pad (or touch panel) described herein may support any functions or gestures that may be performed using a touch panel or a mouse. For example, a function may be a double clicking function to select a selectable option displayed on a user interface presented on at least one of the electronic device display or the portable mobile communication device display. As a further example, a function may be a right clicking function to select selectable secondary options associated with icons presented on a user interface. As a further example, a function may be a dragging function (e.g., dragging one or more icons across a user interface).

The touch pad may support at least one of single-touch or multi-touch input. As used herein, multi-touch input refers to a situation where the touch pad receives at least two distinct simultaneous or non-simultaneous touches. The functions or gestures supported by the touch pad are not limited to the functions or gestures described herein.

In some embodiments, a user may manually switch between different modes by inputting or selecting a mode on the user interface of the portable mobile communication device. Exemplary input mechanisms for the portable mobile communication device include touch panel input, key input, voice input, etc.

In other embodiments, the portable mobile communication device may be configured to automatically switch modes based at least partially on a direction of a user's gaze. The gaze may be associated with the user's eye (or eyes) and/or the user's face. Therefore, the direction associated with the user's eye (or eyes) may be the line of sight associated with the user's eye (or eyes) and/or the user's face. The direction of the user's gaze may be determined using one or more image capturing devices in the portable mobile communication device. In some embodiments the direction of the user's gaze may be determined using one or more front-facing image capturing devices mounted on the portable mobile communication device. The determined direction is communicated to a processor associated with the portable mobile communication device. If the direction of the user gaze is determined, within a degree of statistical confidence, to be in the direction of the portable mobile communication device display, the portable mobile communication device displays the user interface on the portable mobile communication device display. Additionally, since the portable mobile communication device is in communication with the electronic device, the portable mobile communication device sends a signal to the electronic device instructing the electronic device to display the same user interface that is visible on the portable mobile communication device display. Therefore, if a graphical indicator (e.g., cursor) is visible on the portable mobile communication device display, the same graphical indicator is also visible on the electronic device display. When a user moves the graphical indicator on the portable mobile communication device display, the graphical indicator on the electronic device display also moves. In some embodiments, there may be a small delay between the interaction on the portable mobile communication device and the interaction displayed on the electronic device display.

In various embodiments described herein, a degree of statistical confidence may be configured based on one or more learning algorithms embodied in computer programmable or readable code stored in at least one the portable mobile communication device or the electronic device. The learning algorithms may be configured to determine a degree of statistical confidence based on statistical data. In some embodiments, the degree of statistical confidence and/or the one or more learning algorithms may be customized or calibrated by a user.

If the direction of the user gaze is determined, within a degree of statistical confidence, to be in the direction of the electronic device display, the portable mobile communication device does not display the user interface on the portable mobile communication device display. Instead, the touch panel associated with the portable mobile communication device may display a blank interface, and the touch panel may function as a touch pad or a track pad. Additionally, since the portable mobile communication device is in communication with the electronic device, the portable mobile communication device sends a signal to the electronic device instructing the electronic device to display a user interface (e.g., the portable mobile communication device user interface) and to display a visible graphical indicator (e.g., cursor) on the user interface. In embodiments described herein, the movement of this graphical indicator may be controlled by the user via the touch pad. In some embodiments, prior to receiving the portable mobile communication device's signal, the electronic device may already be configured to display a visible graphical indicator on the user interface of the electronic device. However, after the portable mobile communication device determines that the user gaze is directed at the electronic device and consequently configures itself to function as a touch pad, the portable mobile communication device sends a signal to the electronic device instructing the electronic device that the movement and operation of the visible graphical indicator will be controlled by the touch pad.

Additionally or alternatively, the direction of the user's gaze may be determined using one or more image capturing devices associated with the electronic device. The determined direction is communicated to a processor associated with the electronic device. If the direction of the user gaze is determined, within a degree of statistical confidence, to be in the direction of the portable mobile communication device display, the processor associated with the electronic device initiates transmission of a signal to the portable mobile communication device instructing the portable mobile communication device to display the portable mobile communication device's user interface on the portable mobile communication device display. Additionally, the processor configures the electronic device to display the same user interface that is visible on the portable mobile communication device display. Therefore, any interactions on the portable mobile communication device are replicated on the electronic device display.

If the direction of the user gaze is determined, within a degree of statistical confidence, by the one or more image capturing devices associated with the electronic device to be in the direction of the electronic device, the processor associated with the electronic device initiates transmission of a signal to the portable mobile communication device instructing the portable mobile communication device to not display the user interface on the portable mobile communication device display. Instead, for example, the transmitted signal from the electronic device instructs the portable mobile communication device to switch to touch pad or track pad mode. Consequently, the touch panel associated with the portable mobile communication device may display a blank interface, and the touch panel may function as a touch pad or a track pad. Additionally, the processor configures the electronic device to display a user interface (e.g., the portable mobile communication display user interface) and to display a visible graphical indicator (e.g., cursor) on the user interface. As described herein, the movement of this graphical indicator may be controlled by the user via the touch pad.

In some embodiments, a visible graphical indicator may already be present on the user interface displayed on the electronic device, and the processor associated with the electronic device does not need to configure the electronic device to display the visible graphical indicator. Instead, the processor needs to configure the electronic device so that the movement and operation of the graphical indicator is controlled by interactions with the touch pad associated with the portable mobile communication device. As explained previously, in some embodiments, the portable mobile communication display may display the visible graphical indicator on a static or unchanging background.

Additionally or alternatively, in some embodiments, the image capturing devices associated with the electronic device and the portable mobile communication device work together in determining the direction of the user's gaze. In such embodiments, each of the portable mobile communication device and the electronic device may independently determine the direction of the user's gaze using image capturing devices situated on the portable mobile communication device and the electronic device. Subsequently, the electronic device may communicate its determined direction to the portable mobile communication device. A processor associated with the portable mobile communication device receives the direction of the user's gaze as determined by the electronic device, and combines the received direction with the direction of the user's gaze as determined by one or more image capturing devices associated with the portable mobile communication device in order to make a final determination regarding the direction of the user's gaze. In other embodiments, rather than the electronic device communicating its determined direction to the portable mobile communication device, the portable mobile communication device may communicate the direction determined by the portable mobile communication device to the electronic device. In such embodiments, the electronic device may combine the direction determined by the portable mobile communication device with the direction determined by the electronic device to make a final determination regarding the direction of the user's gaze.

An image capturing device associated with at least one of the portable mobile communication device or the electronic device may include eye and face tracking software that assists the image capturing device to determine a direction of the user's gaze. While eye tracking software assists in determining the direction of the user's eye (or eyes), face tracking software assists in determining the direction of the user's face. As used herein, the user's face refers to the frontal view of the user's face, and not a side view of the user's face. The direction associated with a user's eye or a user's face refers to a line of sight associated with the user's eye or the user's face.

In some embodiments, the user's eye (or eyes) and the user's face may be pointing towards substantially different directions. In such embodiments, the user interfaces of the portable mobile communication device and the electronic device may be configured based on the direction of the user's eye (or eyes), and not based on the direction of the user's face. Therefore, the image capturing devices associated with the portable mobile communication device and associated with the electronic device have the capability to determine that the user's eye (or eyes) and the user's face are pointing towards substantially different directions.

In some embodiments, at least one of the portable mobile communication device or the electronic device determines that the direction of the user gaze (e.g., the user's eye (or eyes) may be pointing neither towards the portable mobile communication device display and nor towards the electronic device. In such embodiments, the portable mobile communication device may be configured to display the user interface on the portable mobile communication device display. Additionally, the electronic device is configured to display the same user interface that is visible on the portable mobile communication device display.

In some embodiments, at least one of the portable mobile communication device or the electronic device determines that the direction of the user gaze (e.g., the user's eye or eyes) may be pointing at least partially towards both the portable mobile communication device display and towards the electronic device. In such embodiments, the portable mobile communication device may be configured to display the user interface on the portable mobile communication device display. Additionally, the electronic device is configured to display the same user interface that is visible on the portable mobile communication device display.

In some embodiments, the electronic device is a television, monitor, smart screen, or tablet. In some embodiments, at least one of the portable mobile communication device or the electronic device determines that the user's gaze is in the direction of the electronic device. As explained previously, in some embodiments, in response to this determination, the portable mobile communication display functions as a track pad, where the track pad can be used to interact with the user interface displayed on the electronic device. In some embodiments, the user selects, via the track pad, an option on the user interface displayed on the electronic device to switch to electronic device mode in order to operate one or more functions associated with the electronic device. Therefore, in the electronic device mode, the track pad may configure itself to display one or more options that would normally be associated with a remote control device associated with the electronic device. Each of the options may be activatable based on the user's touch. Thus, the portable mobile communication display functions as an electronic remote control device for the electronic device. For example, when the electronic device is a smart screen, the track pad may be operating in smart screen mode and may be used to select a 'stylus' option. When the user selects this option, the user may use the track pad as a stylus to draw or write on the smart screen display. Additionally, the track pad may be used to select an 'erase' option. When the user selects this option, the user may use the track pad to erase information (e.g., text, graphics, etc.) that is visible on the smart screen display.

When the electronic device is a television, the user may use the track pad to switch to television mode in order to watch television channels (or select options associated with television channels or programs) rather than interact with the user interface. When the user selects, via the track pad, an option on the user interface displayed on the television to switch to television mode, the portable mobile communication display may configure itself to display electronic remote control options, where the options are activatable based on the user's touch. Exemplary selectable options include channel changing options, volume changing options, recording options, etc. Thus, the portable mobile communication device may switch from track pad mode to remote control mode. Therefore, in such embodiments, the portable mobile communication display functions as an electronic remote control device for the television.

In embodiments described herein, an image capturing device associated with either the portable mobile communication device or the electronic device captures video or a series of still images at periodic intervals. In some embodiments, the period between intervals is at least one of determined by the user or determined automatically by at least one of the portable mobile communication device or the electronic device. In some embodiments, each of the portable mobile communication device and the electronic device may include more than one image capturing device (e.g., two image capturing devices situated on opposite edges of the portable mobile communication device or the electronic device).

Referring now to FIG. 1, FIG. 1 presents a first mode of operation associated with a portable mobile communication device and an electronic device described herein. FIG. 1 presents an embodiment of an electronic device 114, which in this case is a television, and a portable mobile communication device 112. Also indicated is the line of sight 120 associated with an image capturing device mounted on the electronic device 114, and the line of sight 110 associated with an image capturing device mounted on the front face of the portable mobile communication device 112. Also indicated is the direction of the user's gaze 130. In this embodiment, the direction of the user's gaze 130 may be the line of sight associated with the user's eye and/or the user's face. In the embodiment presented in FIG. 1, at least one of the portable mobile communication device 112 or the electronic device 114 determines that the user gaze is at least partially directed at the front face of the portable mobile communication device 112. Therefore, in accordance with the embodiments described previously, the portable mobile communication device 112 may be configured to display the user interface on the portable mobile communication device display 112. Additionally, the electronic device 114 is configured to display the same user interface that is visible on the portable mobile communication device display 112.

Referring now to FIG. 2, FIG. 2 presents a second mode of operation associated with a portable mobile communication device and an electronic device described herein. FIG. 2 presents an electronic device 114 and a portable mobile communication device 112. Also indicated is the line of sight 120 associated with an image capturing device mounted on the electronic device 114, and the line of sight 110 associated with an image capturing device mounted on the front face of the portable mobile communication device 112. Also indicated is the direction of the user's gaze 130. In this embodiment, the direction of the user's gaze 130 may be the line of sight associated with the user's eye and/or the user's face. Also indicated is a graphical indicator 150 (e.g., cursor) displayed on the electronic device 114. As explained previously, a user can control this graphical indicator 150 using the portable mobile communication device 112 that functions as a track pad.

In the embodiment presented in FIG. 2, at least one of the portable mobile communication device 112 or the electronic device 114 determines that the user gaze is at least partially directed at the electronic device 114. Therefore, in accordance with the embodiments described previously, the portable mobile communication device 112 may be configured to function as a touch pad or a track pad to control a user interface (or a graphical indicator 150) displayed on the electronic device 114. Additionally, the electronic device 114 is configured to display a user interface that is controllable using the portable mobile communication device display 112 that functions as a touch pad. As explained previously, the user interface displayed on the electronic device 114 is an interface that is being executed by a processor associated with the portable mobile communication device, while in other embodiments, the user interface is an interface that is being executed by a processor associated with the electronic device 114.

Referring now to FIG. 3, FIG. 3 is a diagram illustrating a front view of external components of an exemplary portable mobile communication device. As illustrated in FIG. 3, device 112 may include a housing 305, a microphone 310, a speaker 320, a keypad 330, function keys 340, a display 350, and a camera button 360.

Housing 305 may include a structure configured to contain or at least partially contain components of device 112.

For example, housing 305 may be formed from plastic, metal or other natural or synthetic materials or combination(s) of materials and may be configured to support microphone 310, speaker 320, keypad 330, function keys 340, display 350, and camera button 360.

Microphone 310 may include any component capable of transducing air pressure waves to a corresponding electrical signal. For example, a user may speak into microphone 310 during a telephone call. Microphone 310 may be used to receive audio from the user or from the environment surround the device 112. Speaker 320 may include any component capable of transducing an electrical signal to a corresponding sound wave. For example, a user may listen to music through speaker 320.

Keypad 330 may include any component capable of providing input to device 112. Keypad 330 may include a standard telephone keypad. Keypad 330 may also include one or more special purpose keys. In one implementation, each key of keypad 330 may be, for example, a pushbutton. Keypad 330 may also include a touch screen. A user may utilize keypad 330 for entering information, such as text or a phone number, or activating a special function. In some embodiments, the keypad 330 may include virtual keys that are incorporated into a touch screen display 350. As used herein, a touch screen display may also be referred to as a touch panel display.

Function keys 340 may include any component capable of providing input to device 112. Function keys 340 may include a key that permits a user to cause device 112 to perform one or more operations. The functionality associated with a key of function keys 340 may change depending on the mode of device 112. For example, function keys 340 may perform a variety of operations, such as recording audio, placing a telephone call, playing various media, setting various camera features (e.g., focus, zoom, etc.) or accessing an application. Function keys 340 may include a key that provides a cursor function and a select function. In one implementation, each key of function keys 340 may be, for example, a pushbutton. In some embodiments, the function keys 340 are virtual keys that are incorporated into a touch screen display 350.

Display 350 may include any component capable of providing visual information. For example, in one implementation, display 350 may be a liquid crystal display (LCD). In another implementation, display 350 may be any one of other display technologies, such as a plasma display panel (PDP), a field emission display (FED), a thin film transistor (TFT) display, etc. Display 350 may be utilized to display, for example, text, image, and/or video information. Display 350 may also operate as a view finder, as will be described later. Camera button 360 may be a pushbutton that enables a user to take an image.

Since device 112 illustrated in FIG. 3 is exemplary in nature, device 112 is intended to be broadly interpreted to include any type of electronic device that includes an image capturing component. For example, device 112 may include a wireless phone, a personal digital assistant (PDA), a portable computer, a camera, or a wrist watch. In other instances, device 112 may include, for example, security devices or military devices. Accordingly, although FIG. 3 illustrates exemplary external components of device 112, in other implementations, device 112 may contain fewer, different, or additional external components than the external components depicted in FIG. 3. Additionally, or alternatively, one or more external components of device 112 may include the capabilities of one or more other external components of device 112. For example, display 350 may be an input component (e.g., a touch screen). Therefore, in some embodiments, the display 350 may provide a graphical indicator (e.g., cursor, highlighted box, etc.) that can be controlled using the user's finger, a stylus, or any other touching mechanism. In some embodiments, the keypad 330 and the function keys 340 may be incorporated into the touch screen display 350. Therefore, the touch screen display 350 may substantially cover the entire front face of the device 112. Additionally, or alternatively, the external components may be arranged differently than the external components depicted in FIG. 3.

Referring now to FIG. 4, FIG. 4 is a diagram illustrating a rear view of external components of the exemplary device. As illustrated, in addition to the components previously described, device 112 may include a camera 470, a lens assembly 472, a proximity sensor 476, and a flash 474.

Camera 470 may include any component capable of capturing an image or a stream of images (video). Camera 470 may be a digital camera or a digital video camera. Display 350 may operate as a view finder when a user of device 112 operates camera 470. Camera 470 may provide for automatic and/or manual adjustment of a camera setting. In one implementation, device 112 may include camera software that is displayable on display 350 to allow a user to adjust a camera setting. For example, a user may be able adjust a camera setting by operating function keys 340.

Lens assembly 472 may include any component capable of manipulating light so that an image may be captured. Lens assembly 472 may include a number of optical lens elements. The optical lens elements may be of different shapes (e.g., convex, biconvex, plano-convex, concave, etc.) and different distances of separation. An optical lens element may be made from glass, plastic (e.g., acrylic), or plexiglass. The optical lens may be multicoated (e.g., an antireflection coating or an ultraviolet (UV) coating) to minimize unwanted effects, such as lens flare and inaccurate color. In one implementation, lens assembly 472 may be permanently fixed to camera 470. In other implementations, lens assembly 472 may be interchangeable with other lenses having different optical characteristics. Lens assembly 472 may provide for a variable aperture size (e.g., adjustable f-number).

Proximity sensor 476 may include any component capable of collecting and providing distance information that may be used to enable camera 470 to capture an image properly. For example, proximity sensor 476 may include an infrared (IR) proximity sensor that allows camera 470 to compute the distance to an object, such as a human face, based on, for example, reflected IR strength, modulated IR, or triangulation. In another implementation, proximity sensor 476 may include an acoustic proximity sensor. The acoustic proximity sensor may include a timing circuit to measure echo return of ultrasonic soundwaves. In embodiments that include a proximity sensor 476, the proximity sensor may be used to determine a distance to one or more moving objects, which may or may not be in focus, at least one of prior to, during, or after capturing of an image frame of a scene.

Flash 474 may include any type of light-emitting component to provide illumination when camera 470 captures an image. For example, flash 474 may be a light-emitting diode (LED) flash (e.g., white LED) or a xenon flash. In another implementation, flash 474 may include a flash module.

Although FIG. 4 illustrates exemplary external components, in other implementations, device 112 may include fewer, additional, and/or different components than the exemplary external components depicted in FIG. 4. For example, in other implementations, camera 470 may be a film camera. Additionally, or alternatively, depending on device 112, flash 474 may be a portable flashgun. Additionally, or alternatively, device 112 may be a single-lens reflex camera. In still other implementations, one or more external components of device 112 may be arranged differently.

Referring now to FIG. 5, FIG. 5 is a diagram illustrating internal components of the exemplary portable mobile communication device. As illustrated, device 112 may include microphone 310, speaker 320, keypad 330, function keys 340, display 350, camera 470, camera button 360, memory 500, transceiver 520, and control unit 530. Although not illustrated in FIG. 5, device 112 may additionally include a lens assembly 472, a flash 474, and a proximity sensor 476.

Memory 500 may include any type of storing component to store data and instructions related to the operation and use of device 112. For example, memory 500 may include a memory component, such as a random access memory (RAM), a read only memory (ROM), and/or a programmable read only memory (PROM). Additionally, memory 500 may include a storage component, such as a magnetic storage component (e.g., a hard drive) or other type of computer-readable or computer-executable medium. Memory 500 may also include an external storing component, such as a Universal Serial Bus (USB) memory stick, a digital camera memory card, and/or a Subscriber Identity Module (SIM) card.

Memory 500 may include a code component 510 that includes computer-readable or computer-executable instructions to perform one or more functions. These functions include initiating and/or executing the processes illustrated in FIG. 6. However, the functions are not limited to those illustrated in FIG. 6. The code component 510 may work in conjunction with one or more other hardware or software components associated with the device 112 to initiate and/or execute the processes illustrated in FIG. 6 or other processes described herein. Additionally, code component 510 may include computer-readable or computer-executable instructions to provide other functionality other than as described herein.

Transceiver 520 may include any component capable of transmitting and receiving information wirelessly or via a wired connection. For example, transceiver 520 may include a radio circuit that provides wireless communication with a network or another device.

Control unit 530 may include any logic that may interpret and execute instructions, and may control the overall operation of device 112. Logic, as used herein, may include hardware, software, and/or a combination of hardware and software. Control unit 530 may include, for example, a general-purpose processor, a microprocessor, a data processor, a co-processor, and/or a network processor. Control unit 530 may access instructions from memory 500, from other components of device 112, and/or from a source external to device 112 (e.g., a network or another device).

Control unit 530 may provide for different operational modes associated with device 112. For example, a first mode is when the display 350 displays a user interface, and a second mode is when the display 350 displays a touch pad that can be used to control a user interface displayed on a remote electronic device. In the second mode, the display 350 does not display a user interface. Additionally, control unit 530 may operate in multiple modes simultaneously or switch between different modes. For example, control unit 530 may operate in a camera mode, a walkman mode, and/or a telephone mode. For example, when in camera mode, logic may enable device 112 to capture video and/or audio.

Although FIG. 5 illustrates exemplary internal components, in other implementations, device 112 may include fewer, additional, and/or different components than the exemplary internal components depicted in FIG. 5. For example, in one implementation, device 112 may not include transceiver 520. In still other implementations, one or more internal components of device 112 may include the capabilities of one or more other components of device 112. For example, transceiver 520 and/or control unit 530 may include their own on-board memory.

Referring now to FIG. 6, FIG. 6 presents a process flow 600 for configuring the user interface of a portable mobile communication device. The various process blocks presented in FIG. 6 may be executed in an order that is different from that presented in FIG. 6. At block 610, at least one of the portable mobile communication device or the electronic device in communication with the portable mobile communication device determines a direction associated with a user's gaze.

At block 620, at least one of the portable mobile communication device or the electronic device determines that the direction of the user's gaze is at least partially towards the portable mobile communication device display. In response to this determination and in accordance with the embodiments described previously, the portable mobile communication device may be configured to display a user interface on the portable mobile communication device display. Additionally, the electronic device is configured to display the same user interface that is visible on the portable mobile communication device display.

At block 630, at least one of the portable mobile communication device or the electronic device determines that the direction of the user's gaze is at least partially towards the electronic device display. In response to this determination and in accordance with the embodiments described previously, the portable mobile communication device may be configured to function as a touch pad or a track pad to control a user interface (or a graphical indicator) displayed on the electronic device display. Additionally, the electronic device is configured to display a user interface that is controllable using the portable mobile communication device display that functions as a touch pad.

In accordance with embodiments of the invention, the term "module" with respect to a system (or a device) may refer to a hardware component of the system, a software component of the system, or a component of the system that includes both hardware and software. As used herein, a module may include one or more modules, where each module may reside in separate pieces of hardware or software.

As used herein, the term "automatic" refers to a function, a process, a method, or any part thereof, which is executed by computer software upon occurrence of an event or a condition without intervention by a user.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for configuring a user interface of a portable mobile communication device, the method comprising:
   determining, by at least one of the portable mobile communication device configured to receive and place voice calls or an electronic device in communication with the portable mobile communication device, a direction associated with a user's gaze, wherein the determination is based on a combination of an electronic device-determined direction of the user's gaze and portable mobile communication device-determined direction of the user's gaze; and
   in response to determining the direction associated with the user's gaze is at least partially towards a display associated with the electronic device, configuring a display of the portable mobile communication to function as a touch pad that enables interaction with a user interface displayed on the electronic device display, wherein the user interface is associated with an application being executed by a processor on the portable mobile communication device.

2. The method of claim 1, further comprising:
in response to determining the direction associated with the user's gaze is at least partially towards the portable mobile communication device display, configuring the portable mobile communication device display to display a user interface.

3. The method of claim 2, wherein the electronic device display is configured to display the user interface displayed by the portable mobile communication device display in response to determining the direction associated with the user's gaze is at least partially towards the portable mobile communication device display.

4. The method of claim 1, wherein a graphical indicator is displayed on the user interface, and wherein the touch pad enables interaction with the user interface via the graphical indicator.

5. The method of claim 1, wherein the configuring step further comprises configuring the portable mobile communication device display to not display a user interface.

6. The method of claim 1, wherein the configuring step further comprises configuring the portable mobile communication device display to display a blank interface.

7. The method of claim 1, wherein the at least one of the portable mobile communication device or the electronic device comprises an image capturing component.

8. The method of claim 1, wherein the portable mobile communication device is in wireless communication with the electronic device.

9. The method of claim 1, wherein the electronic device comprises at least one of a television, monitor, smart screen or tablet.

10. The method of claim 1, wherein the direction associated with the user's gaze comprises a line of sight associated with at least one of the user's eye or the user's face.

11. The method of claim 1, wherein the touch pad accepts at least one of single-touch or multi-touch input.

12. The method of claim 1, further comprising:
at least one of:
in response to determining the direction associated with the user's gaze is not at least partially towards the portable mobile communication device display and not at least partially towards the electronic device display, configuring the portable mobile communication device display to display a user interface; or
in response to determining the direction associated with the user's gaze is at least partially towards the portable mobile communication device display and at least partially towards the electronic device display, configuring the portable mobile communication device display to display a user interface.

13. The method of claim 1, further comprising:
in response to receiving a selection of an electronic device mode option via the touch pad, displaying selectable control options on the portable mobile communication device display.

14. The method of claim 1, further comprising:
in response to determining that a direction associated with the user's eye is substantially different from a direction associated with the user's face, determining a direction associated with the user's gaze based on the direction associated with the user's eye.

15. The method of claim 1, further comprising:
enabling a user to input a selection via the portable mobile communication display to switch between modes, wherein, in a first mode, the portable mobile communication device is configured to display a user interface, and wherein, in a second mode, the portable mobile communication device is configured to function as the touch pad that enables interaction with a user interface displayed on the electronic device display.

16. A computer program product for configuring a user interface of a portable mobile communication device configured to receive and place voice calls that is in communication with an electronic device, the computer program product comprising:
a non-transitory computer readable medium comprising code configured to:
determine a direction associated with a user's gaze based on a combination of an electronic device-determined direction of the user's gaze and portable mobile communication device-determined direction of the user's gaze; and
in response to determining the direction associated with the user's gaze is at least partially towards a display associated with the electronic device, configure the portable mobile communication display to function as a touch pad that enables interaction with a user interface displayed on the electronic device display, wherein the user interface is associated with an application being executed by a processor on the portable mobile communication device.

17. A portable mobile communication device configured to receive and place voice calls, which is in communication with an electronic device, the portable mobile communication device comprising:
a display;
an image capturing component;
a touch panel associated with the display; and
a processor configured to:
determine, using the image capturing component, a direction associated with a user's gaze;
combine the determined direction of the user's gaze and an electronic-device determined direction of the user's gaze to result in a final direction of the user's gaze; and
in response to determining the final direction associated with the user's gaze is at least partially towards a display associated with the electronic device, configure the touch panel to function as a touch pad that enables interaction with a user interface displayed on a display associated with the electronic device, wherein the user interface is associated with an application being executed by a processor on the portable mobile communication device.

18. The method of claim 1, further comprising:
in response to determining the direction associated with the user's gaze is at least partially towards a display associated with the electronic device, switch off a display function of the display of the portable mobile communication device.

19. The portable mobile communication device of claim 17, wherein the processor is further configured to:
  in response to determining the final direction associated with the user's gaze is at least partially towards a display associated with the electronic device, switch off a display function of the display of the portable mobile communication device.

* * * * *